Aug. 28, 1951     W. J. O'NEILLY     2,565,878
CUTTING, CLIPPING, SKINNING, AND SHEARING TOOL
Filed July 23, 1947
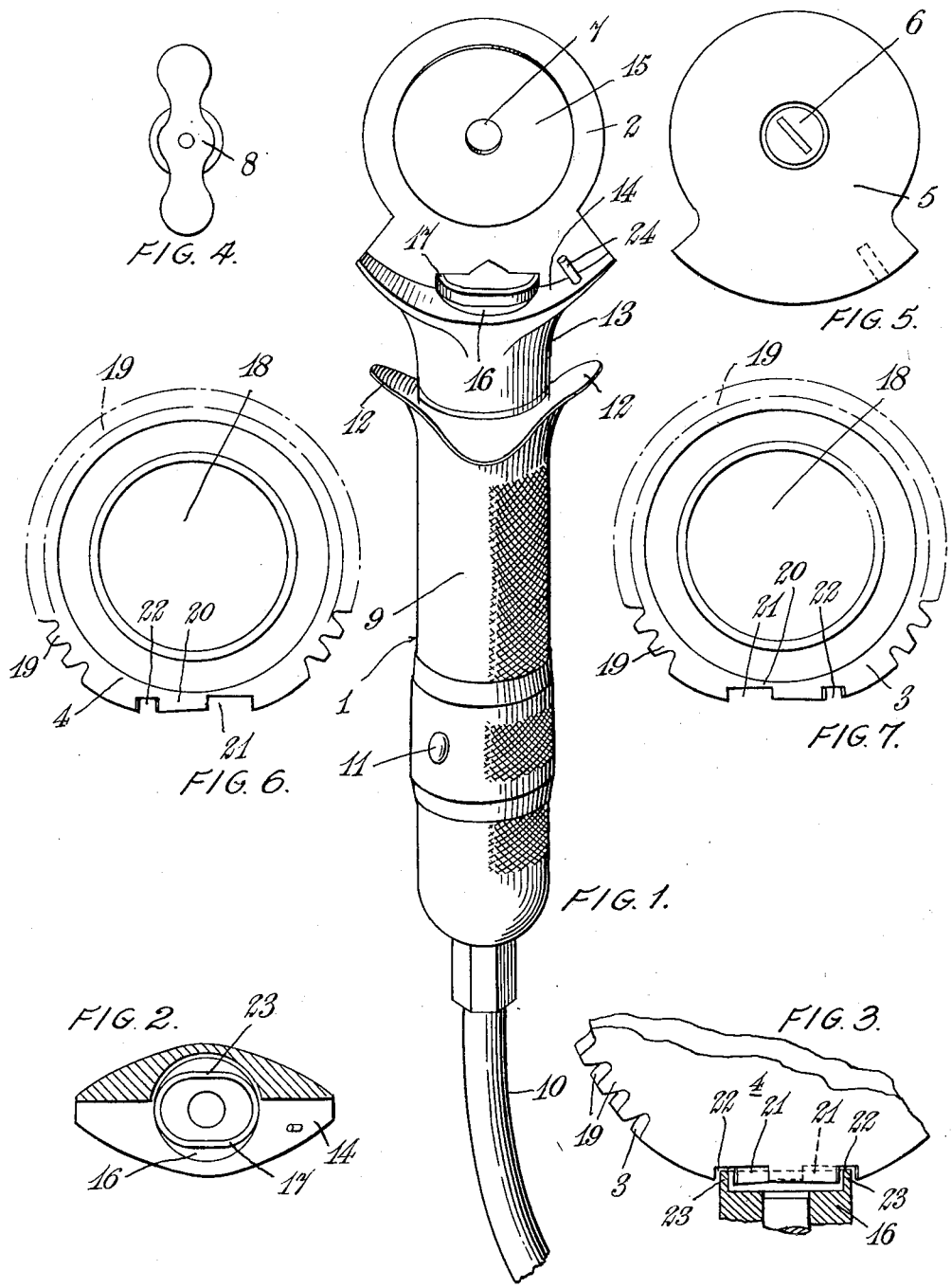
INVENTOR
William Jack O'Neilly
BY
ATTORNEYS Patented Aug. 28, 1951

2,565,878

UNITED STATES PATENT OFFICE 2,565,878

CUTTING, CLIPPING, SKINNING, AND SHEARING TOOL

William Jack O'Neilly, Chipperfield, England, assignor of one-half to Alfred Champion, Abbots Langley, England Application July 23, 1947, Serial No. 762,991
In Great Britain February 4, 1946

Section 1, Public Law 690, August 8, 1946
Patent expires February 4, 1966

1 Claim. (Cl. 30—216)

This invention is concerned with a tool suitable for cutting, clipping, skinning and shearing operations, an object being to provide an improved tool suitable for carrying out various operations such as skinning or shearing animals, cutting linoleum cloth and carpets and so on. In this specification tools according to the invention are referred to generally as cutting tools.

Various proposals have from time to time been put forward for the provision of cutting tools for skinning and shearing animals but most of them have been open to objection in practice. For example some were so designed that liquid waste produced during the skinning process found its way into the driving gear thus destroying the somewhat delicate mechanism in a comparatively short time, while others made use of driving mechanism remote from the tool and connected to the tool by means of a reciprocating flexible member which transmitted the drive from the mechanism to the tool. This was a clumsy arrangement because the reciprocating flexible connector passing through the handle of the tool caused such vibrations that the tool was most unpleasant to operate. It is an object of the present invention to provide a simple and efficient cutting and skinning tool that is not subject to the above mentioned defects.

This invention is concerned with a tool suitable for cutting, clipping, skinning and shearing operations, an object being to provide an improved tool suitable for carrying out various operations such as skinning or shearing animals, cutting linoleum cloth and carpets and so on. In this specification tools according to the invention are referred to generally as cutting tools.

Various proposals have from time to time been put forward for the provision of cutting tools for skinning and shearing animals but most of them have been open to objection in practice. For example some were so designed that liquid waste produced during the skinning process found its way into the driving gear thus destroying the somewhat delicate mechanism in a comparatively short time, while others made use of driving mechanism remote from the tool and connected to the tool by means of a reciprocating flexible member which transmitted the drive from the mechanism to the tool. This was a clumsy arrangement because the reciprocating flexible connector passing through the handle of the tool caused such vibrations that the tool was most unpleasant to operate. It is an object of the present invention to provide a simple and efficient cutting and skinning tool that is not subject to the above-mentioned defects.

According to the present invention there is provided a cutting tool comprising a handle portion to be gripped by the user, a rotatable elongated annular cam having a projecting cam wall supported on the handle portion, two flat disc shaped cutting blades arranged face to face in the cutting head of the tool and supported at their center for angular movement, cutting teeth provided around the periphery of an arcuate portion of each blade and two spaced peripheral slots in each blade positioned to engage with the cam wall, one of the slots in each blade being longer than the other to form a slot in which the cam idles while the driving of the blades is imparted by the engagement of the cam wall with the short slot in each blade whereby rotation of the cam causes the blades to be angularly oscillated in opposite directions to effect cutting with the axis of rotation of the cam in the cutting plane.

In a preferred embodiment of the invention cutting is effected by two blades in the form of substantially circular flat discs arranged face to face, each disc having teeth around the major part of the periphery as shown in the drawings to be hereinafter described. The blades are so assembled in the tool that the long slot of each blade is in registration with the short slot of the other blade. With this arrangement rotation of the elongated annular cam the projecting wall of which engages with the slots in the blades will cause the blades to be angularly displaced respectively to the left and to the right as the part of the cam of long diameter registers with the slots and then in the reverse directions as the part of the cam having the shorter diameter registers with the slots. In this way each blade is angularly displaced or rotated through a few degrees first in one direction and then in the other direction and when one of the blades is moving to the left the other blade is moving to the right so that the blades undergo an angular oscillatory movement in opposite directions.

Mechanism for rotating the cam may be housed within the handle of the tool, this mechanism may comprise a turbine or the equivalent to be operated by compressed air or other gas in which case the tool is arranged to be connected by means of a hollow flexible tube to a source of air or gas. Alternatively a small electric motor may be disposed within the handle and a flexible insulated conductor may be provided to connect the tool to the mains or other source of power.

In order that the invention may be more clearly understood and readily carried into effect reference is now directed to the accompanying drawings which show diagrammatically and by way of example only, one embodiment of the invention.

In the drawings,

Figure 1 is a diagrammatic view of the tool with the parts dismantled.

Figure 2 is a plan view of the cam with the cutting head of the tool removed.

Figure 3 is a detail view showing how the slots in the discs engage with the cam which is shown in section.

Figure 4 is a view of the wing nut to hold the blades in position.

Figure 5 is a view of the cover plate, and

Figures 6 and 7 show two cutting blades in side elevation.

Referring to the drawings 1 indicates the handle portion of a tool embodying the invention and 2 indicates a seating for blades 3 and 4 which form the cutting head of the tool. When the blades 3 and 4 have been assembled on the seating 2 in the manner to be described hereinafter they are held in place by a cover plate 5 provided with a screw 6 which extends through the blades 3 and 4 and through an aperture 7 in the seating 2 after which an adjustable wing nut 8 or the like is employed to hold the parts in position. This wing nut may be used to adjust the pressure between the two blades so that if in course of time the blades become worn due to friction the wing nut 8 may be slightly tightened up to prevent the blades 3 and 4 becoming loose.

The handle portion 1 consists of a cylindrical metal body 9 preferably serrated and provided at the end remote from the cutting head with a flexible connector 10 for the purpose of conducting compressed air or other gas or electric current to mechanism of well known construction housed within the metal body 9. A suitable on/off switch is indicated at 11. The metal body 9 in addition to housing the mechanism referred to forms the handle portion 1 which may be gripped in the hand when using the tool and in order to protect the forefinger and thumb of an operative, guards 12 are provided. If desired these guards may be reduced in size to facilitate operation of the tool.

The handle portion 1 is provided with an extension 13 with which the seating 2 is integrally formed. The seating 2 is shaped to provide a platform 14 upon which the discs 3 and 4 rest and a central boss 15 over which the discs 3 and 4 fit and upon which they are caused to undergo an angular oscillation in opposite directions.

Projecting from the platform 14 is a shaft 16 shaped at its extremity to afford an elongated annular cam 17, see particularly Figure 2. When the switch 11 is moved to the "on" position the shaft 16 is caused to rotate and the elongated annular cam rotates with the shaft.

The blades 3 and 4 are substantially circular in shape as shown in Figure 1 and are provided with a central aperture 18 of a size to fit snugly over the boss 15 on the seating 2. Each blade is provided with teeth 19 around the major part of the periphery and with a much smaller peripheral portion 20 not having teeth.

In the portion 20 of the periphery each blade 2 is provided with two slots, a long slot 21 and a short slot 22. When the blades are assembled on the boss 15 of the seating 2 the short slot 22 of the blade 4 registers with the long slot 21 of the blade 3 and the long slot 21 of the blade 4 registers with the short slot 22 of the blade 3. The arrangement is shown diagrammatically in Figure 3 which also shows how the wall 23 of the annular cam engages with the slots 21 and 22 of the discs 3 and 4.

In order to assist in positioning the blades accurately on the seating 2 the platform 14 is provided with a projection 24 which also positions the cover plate 5.

In operation assuming that the parts of the tool are assembled, rotation of the cam will cause each blade to be angularly displaced or rotated through a few degrees first one way and then the other and further the fact that the long and short slots are reversed in the two blades ensures that when one blade is moving one way the other blade will move the opposite way so that the blades undergo an oscillating movement in opposite directions to effect cutting or skinning. It will be appreciated that the cam 17 owing to its elongated shape rushes against the walls of the short slots 22 of each blade moving them in opposite directions, the long slots 21 do not effect any movement of the blades but merely provide slots for the opposite side of the cam 17 while it is doing work in the short slots 22. The cam wall therefore idles in the long slots 21.

The amount of backward and forward swinging movement permitted to the blades depends upon the dimensions and shape of the cam and the slots, a convenient arrangement gives each blade a movement in each direction approximately equal to the length of a single tooth at the root thereof.

I claim:

A cutting tool comprising a handle portion to be gripped by the user, a cutting head on the handle portion, a rotatable cam supported on said handle portion at said cutting head and having a projecting cam wall of substantially oval outline, means for rotating said cam, said cutting head including two flat disc-shaped cutting blades arranged face to face and supported at their centers for angular movement in a plane which corresponds substantially to the plane of the axis of the cam, cooperating cutting teeth provided around corresponding portions of the periphery of said blades, each of said blades being provided with a pair of peripheral slots which are angularly spaced to cooperate with opposite portions of said projecting cam wall, one of the slots in each blade being longer than the other in a circumferential direction, the relative positions of the two slots in the respective blades being reversed so that when the cam is rotated and the cam wall engages the shorter slot of one blade it idles in the longer slot of the other blade so that the blades will be angularly oscillated in opposite directions to effect cutting.

WILLIAM JACK O'NEILLY.

REFERENCES CITED

The following references are of record in the file of this patent:

UNITED STATES PATENTS

| Number | Name | Date |
| --- | --- | --- |
| 712,500 | Colwell | Nov. 4, 1902 |
| 1,228,838 | Schutz | June 5, 1917 |
| 1,230,710 | Hill | June 19, 1917 |
| 1,400,379 | Schollmeyer | Dec. 13, 1921 |
| 1,929,040 | Schmid | Oct. 3, 1933 |
| 1,945,247 | Wezel | Jan. 30, 1934 |
| 2,155,708 | Hartanov | Apr. 25, 1939 |
| 2,168,703 | Dziedzie | Aug. 8, 1939 |
| 2,263,747 | Stein | Nov. 25, 1941 |

FOREIGN PATENTS

| Number | Country | Date |
| --- | --- | --- |
| 66,685 | Sweden | Jan. 25, 1927 |